United States Patent [19]
Jurek et al.

[11] Patent Number: 6,054,816
[45] Date of Patent: Apr. 25, 2000

[54] ACTIVE SNUBBING IN A DISCHARGE LAMP BALLAST

[75] Inventors: Brian E. Jurek, Austin; Mark A. Stultz, Cedar Park, both of Tex.

[73] Assignee: High End Systems, Inc., Austin, Tex.

[21] Appl. No.: 08/867,566

[22] Filed: Jun. 2, 1997

[51] Int. Cl.[7] ..................................................... G05F 1/00
[52] U.S. Cl. .................... 315/291; 315/209 R; 315/244; 363/53; 363/126
[58] Field of Search ................................. 315/209 R, 291, 315/244, 289, 307, 276; 363/53, 17, 126

[56] References Cited

U.S. PATENT DOCUMENTS

| | | |
|---|---|---|
| 4,328,446 | 5/1982 | Fallier, Jr. et al. ......................... 315/47 |
| 4,342,948 | 8/1982 | Samuels .................................. 315/290 |
| 4,403,173 | 9/1983 | Mayer ...................................... 315/289 |
| 5,424,611 | 6/1995 | Moriarty, Jr. ............................... 315/94 |

*Primary Examiner*—Haissa Philogene

[57] ABSTRACT

A snubbing network is provided for reducing electromagnetic ("EM") radiation from and power dissipation of a lamp discharge ballast. The snubbing network employs at least one active device. That device being a switch coupled in parallel with the modulating switch within a converter of the ballast. The snubbing switch, in conjunction with a current limiting inductor, and a voltage change rate limiting capacitor serve to substantially eliminate reverse recovery current within a freewheeling diode of the converter prior to closing the larger (modulating) switch. Reducing the reverse recovery current before closing the modulating switch helps minimize power dissipation during switch closure. A benefit of reduced power dissipation is a reduction in EM radiation from the lamp ballast to noise sensitive electronic components placed nearby.

19 Claims, 6 Drawing Sheets

ACTIVE SNUBBING IN A DISCHARGE LAMP BALLAST

BACKGROUND OF THE INVENTION

1. Field of the Invention

This invention relates to a discharge lamp and, more particularly, to an electronic ballast which operates the lamp with minimal electromagnetic emission during power switching within the ballast.

2. Description of the Related Art

The structure and operation of a discharge lamp, henceforth referred to as a "lamp" is generally well known. A lamp typically comprises a quartz tube filled with gas. The ambient within the tube is exposed to a pair of electrodes spaced at opposite ends of the tube. During times when current is passed between the electrode pair, the gas is excited to a plasma state which causes light emission as the gas is being excited.

A ballast serves as the primary control element for the electrode pair. Essentially, a ballast operates as a current regulator. The ballast provides sufficient energy to excite the gas between the pair of electrodes. Generally speaking, there are two types of ballast: an electronic ballast or a core-coil ballast. Regardless of its form, a ballast is used to limit current through the lamp and hence limit power applied to the lamp.

Lamps, and ballasts associated with lamps, are used in various commercial settings. For example, a lamp may be used in a luminaire, such as that shown in FIG. 1. Luminaire 10 depicts various fixtures surrounding a lamp and ballast. Popular fixtures include any element (e.g. reflector, lens. etc.) which bring about a desired illumination pattern. Accordingly, luminaire 10 comprises a ballast 12, lamp 14 and various optics 16. Optics 16 may include special lenses for focusing or dispersing a light output 18. The lens may include a colored filter selectively placed across the lens surface for masking portions of the light output into a desired pattern. The pattern may rotate in conjunction with possible movement of luminaire 10 to achieve an almost limitless emission display upon object 20. That display being discernible by an observer 22 located distant from object 20.

Figure 1:
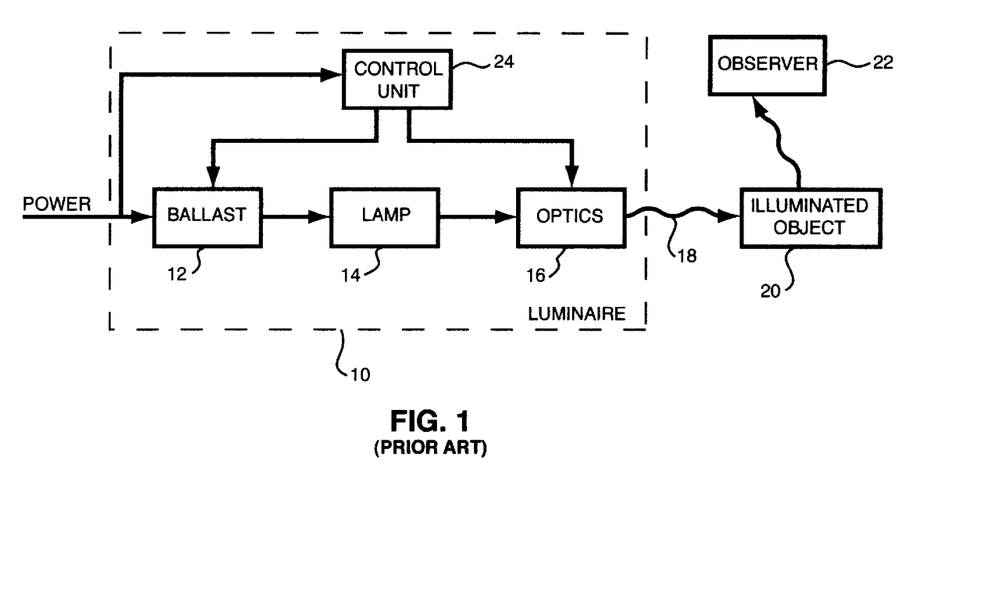
FIG. 1 is a block diagram of an illuminated object responsive to a combination of electronic components used in a conventional luminaire.

In order to control lamp 14 output and selectively pattern luminaire 10 output, a control unit 24 may be used. Control unit 24 comprises various electronic circuitry required to control the output from ballast 12 and optics 16. For example, control unit 24 can be configured to forward various control signals at a select frequency dictated by the operator. The application of those intervals might be mandated by the demands of studio and stage lighting. Control unit 24 thereby comprises electronic circuits which can be hardware, software or firmware modified to produce a control signal of alterable time duration and/or intensity.

Figure 2:
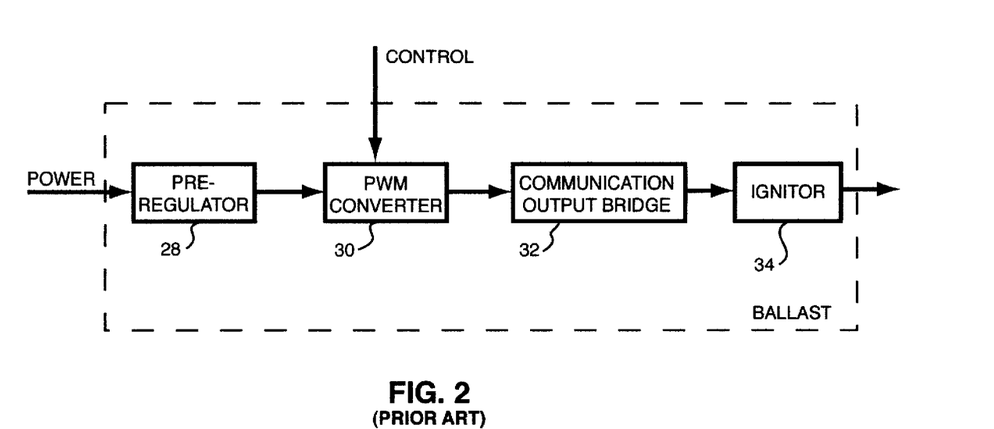
FIG. 2 is a block diagram of electronic components used in a conventional ballast.

FIG. 2 depicts an example of several components used in forming ballast 12. Included with many conventional ballast is a pre-regulator 28. Regulator 28 serves many functions. For example, regulator 28 includes circuitry which can correct a power factor input of the power input signal to limit line harmonics and allow a wide range of input voltages. If converter 30 is a DC-to-DC converter, than an AC power input must be regulated to DC by regulator 28. Accordingly, regulator 28 will involve a means of rectification.

Converter 30 derives regulated power from regulator 28 and, more importantly, control signals from control unit 24 (shown in FIG. 1). Accordingly converter 30 can be a pulsewidth modulated ("PWM") converter, a primary function of which is to modulate the regulated power input to the converter according to the control signal duration (i.e., width). The control signals can be regularly dispatched at a given duty cycle to, for example, dim converter 30 output. Alternatively, the control signals can be sent in an irregular pattern, or at lower frequencies, to present a discernible output.

Converter 30 output may require additional regulation or conversion. The additional conversion may be in the form of a commutation output bridge 32, of well know design. The purpose of bridge 32 is to alternate the direction of current flow which is typically required by this type of lamp. Ignitor 43 serves primarily to ignite (i.e., ionize) the gas between the electrodes of lamp 14 (shown in FIG. 1).

One of the most important challenges facing electronic ballast designers is to make the ballast electromagnetically compliant. This entails limiting electromagnetic emissions from converter 30 during switch transients. More specifically. electromagnetic radiation is produced by switch transitions within converter 30 in response to the control signals forwarded thereto.

Figure 3:
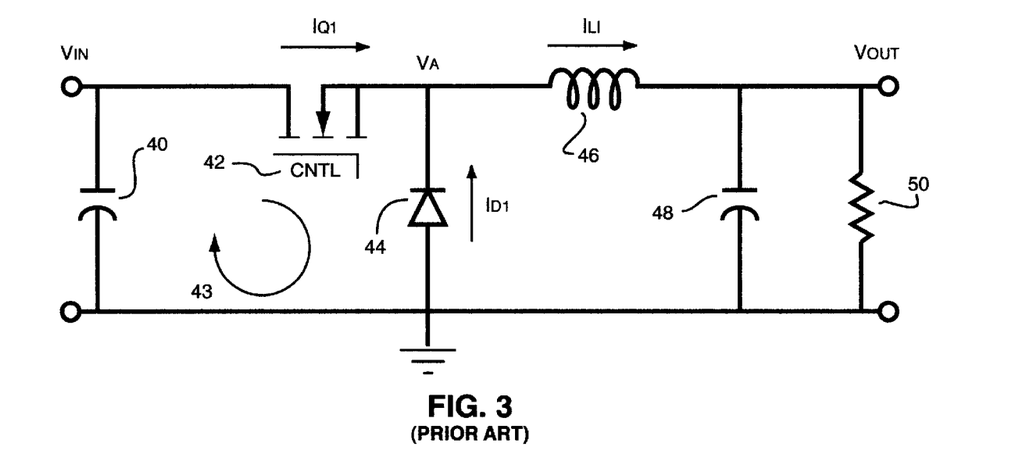
FIG. 3 is circuit schematic of a converter adapted for modulation according to a conventional design.

FIG. 3 illustrates a conventional portion of converter 30, and FIGS. 4a–4e depict current and voltage derived from converter 30 during transient switch conditions. Converter 30, comprises a network of active and passive components coupled between an input terminal and an output terminal. The input terminal receives the regulated voltage $V_{IN}$, and the modulated voltage is produced at the output terminal as $V_{OUT}$. The regulator output can be modeled as having a large output impedance partially depicted as capacitor 40. Capacitor 40 maintains the power supply $V_{IN}$, regardless of the state of switch 42. Switch 42 comprises any power switching device, such as a thyristor or transistor (MOS or bipolar) which is responsive to the control signal. During times when switch 42 is open, freewheeling diode 44 is forward biased and receives the current through inductor 46. The resistor 50 simulates a load. The load being that attributable to any device connected to converter 30, the device being, for example, a commutation device, ignitor or lamp.

During times when switch 42 is closed, diode 44 becomes reverse biased based on the translation of voltage $V_{IN}$ to node $V_A$. Movement from a forward bias to a reverse bias condition does not instantaneously terminate current through diode 44. Instead, diode 44 will conduct current in a negative fashion due to what is known as the "reverse recovery" characteristics of the diode. Reverse recovery occurs only momentarily but, unfortunately, causes relatively large current transient in the interim between the forward bias and reverse bias condition. The peak magnitude of this current is increased by attention to printed wiring board layout for minimal electromagnetic radiation.

Reverse recovery is dictated from the natural response of a diode or rectifier pn junction. When a diode is driven from a reversed biased condition to a forward biased condition, the diode response is accompanied by a current transient for a time before it recovers to its steady state. The transient period from a reverse to a forward condition is known as forward recovery time. Transition time from a forward bias condition to a reverse bias condition is known as reverse recovery time, as described above. As a practical matter, the forward recovery time does not normally constitute a serious practical problem, and hence it is primarily the reverse recovery time that limits diode switching performance.

The larger reverse recovery time is dictated by the time it takes to sweep minority carriers originally derived during forward bias from the other side of the junction back into that junction during reverse bias. To attain steady state value, the minority carrier distribution at the moment of voltage reversal requires the injected, or excess minority carriers to drop nominally to zero. Until that happens, the diode will continue to conduct current in either direction across the pn interface.

The effect of reverse recovery on noise generation is shown in reference to FIGS. 4a–4e. The magnitude of the reverse recovery current is limited only by the stray inductance of loop 43. The contribution of loop 43 electromagnetic noise is proportional to the peak current. It is only during the transient portion of switch 42 operation that reverse recovery becomes a problem, that problem manifesting itself as noise emitted from converter 30 as well as power dissipated in the switch and diode and the voltage and current stresses applied to those components. The noise is generally termed electromagnetic ("EM") noise resulting primarily from current, voltage and power spikes during the switch transition interval.

Figure 4A:
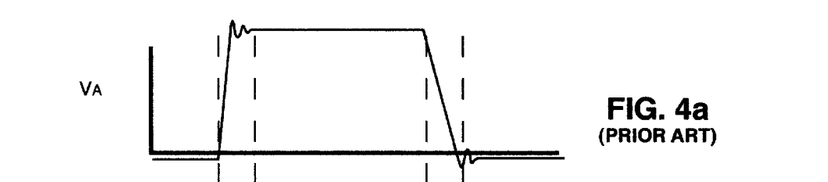
FIGS. 4a–4e are timing diagrams of operational voltage, current and power characteristics of the circuit shown in FIG. 3.

FIG. 4a depicts the voltage at node VA. That voltage increases rather sharply at time $T_1$ when switch 42 is closed. A certain amount of ringing appears during the interim immediately after switch 42 is closed at $T_1$ and before voltage reaches steady state at $T_2$. Ringing also occurs between time $T_3$ and $T_4$, represented as the interval between opening of switch 42 at time $T_3$ and steady state at time $T_4$. Thus, closure of switch 42 occurs at time $T_1$, and opening of switch 42 occurs at time $T_3$. Times $T_2$–$T_3$ illustrate steady state.

Figure 4B:
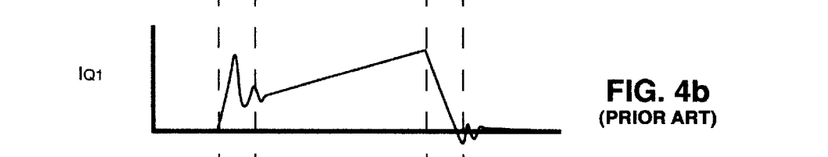

FIG. 4b indicates current $I_{Q1}$ through switch 42. $I_{Q1}$ peaks at the interim between $T_1$ and $T_2$ due primarily to the reverse recovery current through diode 44. That peak does not, however, demonstrate itself at intervals between $T_3$ and $T_4$ due to the lessening problem of forward recovery current. Thus, the problem of EM noise occurs almost predominantly during closure of switch 42.

Figures 4C, 4D:
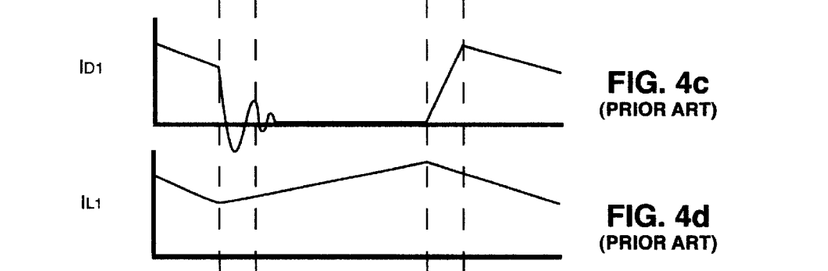

FIG. 4c indicates the reverse recovery current $I_{D1}$ through diode 44 in the interim between $T_1$ and $T_2$. $I_{D1}$ extends from the n side of the junction to the p side of the junction, and therefore is represented as a negative value from the arrow shown in FIG. 3.

FIG. 4d illustrates a somewhat consistent current $I_{L1}$ through inductor 46 during closing and opening of switch 42. If switch 42 is opened, then power from $V_{IN}$ is terminated to inductor 46, and $I_{L1}$ decreases. However, once switch 42 is closed, then the supplied power produces an increase in $I_{L1}$. Transient current peaks through inductor 46 are minimized by the nature of inductance and also by the voltage clamping action of freewheeling diode 44 whenever switch 42 is open.

Figure 4E:
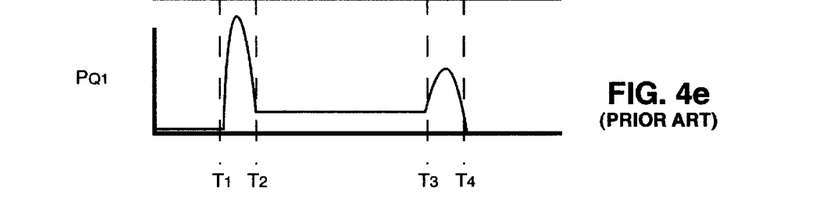

FIG. 4e illustrates the effect of reverse recovery current on power dissipation $P_{Q1}$ through switch 42 during the transient period between $T_1$ and $T_2$. During the reverse recovery time immediately after switch 42 closure, diode 44 remains in conduction and has not yet established a depletion region. In this state, diode 44 will conduct in either direction until a junction has sufficient time to discharge the stored minority carriers. The current magnitude during the reverse recovery time (i.e., reverse recovery current) is typically quite high and is limited predominantly by the inductance within the trace conductor load as viewed by loop 43. Power dissipation principally arising from reverse recovery (i.e., reverse recovery power) is labeled in FIG. 4e as reference numeral 54.

It is desired that reverse recovery power, demonstrated as EM noise and heat, be minimized in many industrial lighting applications. For example, EM radiation from ballast used in stage illumination must be minimized so as not to effect for example, sound equipment placed nearby. Large EM radiation might interfere with sound reproduction characteristics of high fidelity instruments, amplifiers, audio/video products, computers, and radio frequency ("RF") devices, etc., placed near the noisy ballast. An improvement in conventional ballast design for certain discharge lamp applications is therefore needed to meet various compliance requirements.

SUMMARY OF THE INVENTION

The problems outlined above are in large part solved by an improved discharge lamp ballast. Specifically, the improved ballast comprises a pulse width modulated converter with relatively low transient noise output. Minimal noise output is achieved by a snubbing network which contains an active component. The active component, according to a preferred embodiment, is a second switch. The combination of the main, or first switch, and the second switch activated at dissimilar times helps minimize the reverse recovery current within the freewheeling diode.

The snubbing network includes the secondary (second) switch placed in series with a second inductor and a second diode. The combination of second switch, inductor and diode extend in parallel with the primary (first) switch. The snubbing network also includes a capacitor having one terminal connected across the free wheeling diode. Yet further, the snubbing network includes a diode having one terminal connected between the second switch and the second inductor.

Of suitable benefit is the component sizes of the second switch and second inductor relative to the larger first switch and load (or first) inductor. The second switch closes before the first switch closes, and does so to allow current from the power supply through the second inductor and the second diode. That current serves to pre-charge the terminal between the first switch and the first inductor. Pre-charging the terminal is achieved by charging the capacitor associated with the snubbing network. As the capacitor is being charged, the freewheeling diode moves from a forward bias condition into a reverse bias condition within the control of the much smaller second switch and inductor. Any reverse recovery current attributed from the freewheeling diode to the snubbing network is relatively small given the current carrying capabilities of the second switch and inductor.

Closing the second switch pre-charges the snubbing capacitor and reverse biases the freewheeling diode before the first switch is closed. The reverse recovery current within the freewheeling diode is essentially eliminated prior to closing the relatively large first switch. Closing the second switch, followed by opening the second switch at a time preferably before which the first switch is closed not only reduces the reverse recovery current/power, but more importantly reduces EM noise radiated or conducted from the ballast. According to an alternative embodiment, the second switch might possibly remain closed for a short period of time after which the first switch is closed.

Broadly speaking the present invention contemplates a voltage converter. The voltage converter can be one which pulsewidth modulates a power supply presented thereto. The voltage converter comprises a first switch and a first inductor coupled in series between an input terminal and an output terminal of the voltage converter. A second switch is also provided. The second switch is coupled in series with a second inductor and a diode across the first switch. The second switch is adapted to close prior to closing the first switch for the benefit of reducing transient power dissipation in the interim between closing of the second switch and closing of the first switch.

The present invention further contemplates a system for modulating power to a gas-filled lamp. The system includes a ballast which modulates the power via a pair of switches. The switches are responsive to a switching control signal forwarded thereto. The switching control signal causes a first switch of the pair of switches to close immediately after a second switch of the pair of switches closes and then opens. The gas-filled lamp includes a spaced pair of electrodes for receiving the modulated voltage and/or current.

The present invention yet further contemplates a method for snubbing noise emitted from a discharge lamp ballast. The method includes closing the second switch to reverse bias the freewheeling diode and minimize voltage differential across the first switch. Thereafter, the second switch is opened preferably before the first switch is closed to minimize noise emitted during closure of the first switch.

The present invention still further contemplates an assembly for mounting a power switching device to a thermal transfer element. The assembly comprises a thermally conductive member arranged between a first surface of the power switching device and a first surface of the thermal transfer element. Both the power switching device and the thermal transfer element have opposing first and second surfaces. A retainer is included with the assembly having one surface which abuts a second surface of the power switching device. A biasing member is further included, and is coupled to draw the retainer against the second surface of the power switching device. When sufficiently biased, the retainer secures the thermally conductive member between the thermal transfer element and the power switching device. The thermally conductive member is therefore one which is relatively conductive to thermal energy yet relatively non-conductive to electrical current. The assembly further comprises a paraffin-based, thermally conductive material interposed between the first surface of the power switching device and the thermally conductive member. The paraffin-based, thermally conductive material may also be interposed between the thermally conductive member and the first surface of the thermal transfer element. The opposing, second surface of the thermal transfer device includes a plurality of surfaces protruding from the second surface a spaced distance apart.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 5:
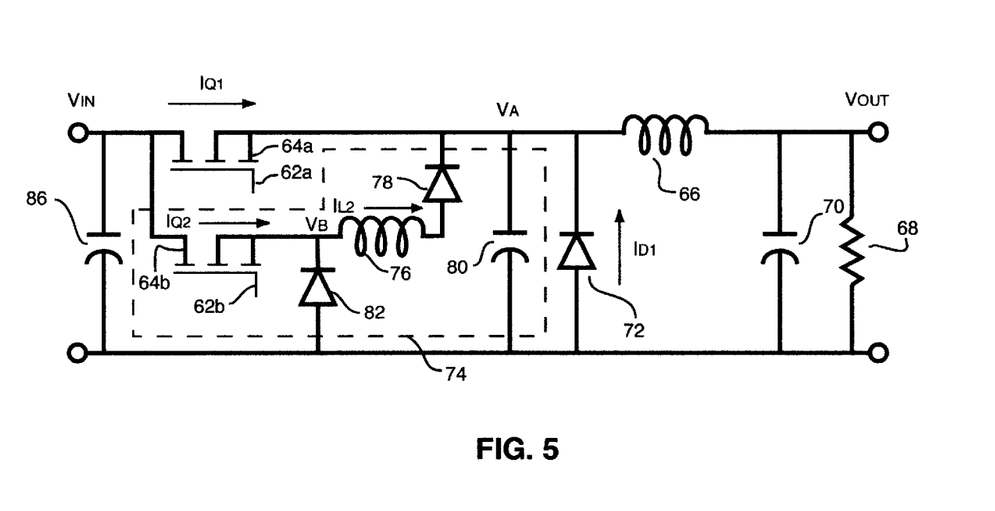
FIG. 5 is a circuit schematic of a converter adapted for modulation according to an embodiment of the present invention.

Turning now to the drawings, FIG. 5 illustrates an improved converter 60, preferably configured within a discharge lamp ballast. Converter 16 serves, in part, to convert unregulated DC voltage $V_{IN}$ to regulated or variable DC voltage $V_{OUT}$. Input voltage $V_{IN}$ can be derived from an AC rectifier or from a DC power supply with possibly a pre-regulator situated between converter 60 and the power source. Output voltage $V_{OUT}$ regulated or modulated according to, for example, a pulsewidth duration established by control signals applied to switch control terminals 62a and 62b. Switches 64a and 64b are henceforth referred to as first and second switches, respectively.

Switches 64a and 64b are power switching device, and preferably semiconductor devices. Importantly, the current transfer characteristics of switch 64b may be substantially lower than that of switch 64a. This can be accomplished by, for example, by specifying part with a smaller die area. The on/off currents through first and second switches are denoted as $I_{Q1}$ and $I_{Q2}$, respectively.

In addition to first switch 64a, a first inductor 66 is coupled in series with switch 64a between the input and output terminals. The current through inductor 66 will vary depending on whether switches 64 are on or off. If on, then the current through inductor 66 will increase over time. The load associated with the output terminal is represented primarily as a load resistance and load capacitance, shown as reference numerals 68 and 60, respectively. The combination of inductor 66 and capacitor 70 ensures the current through load resistor 68 and voltage across load resistor 68 do not change instantaneously. This is primarily attributed to the function of a ballast, and its current and voltage regulation capability. Without a ballast, a sudden large increase in the supply voltage or current will result in malfunction or damage to the lamp. To ensure the voltage across the switch 64a does not significantly exceed the input voltage, a freewheeling diode 72 is connected across the inductor and load. When switches 64 are open, the load current will "freewheel" through diode 72. Power flows from $V_{IN}$ only when the switches are on, which corresponds to cessation of freewheeling current through diode 72.

As described above, freewheeling diode 72 has inherent reverse recovery current during the interim between the time which it changes from a forward bias condition to a reverse bias condition. The reverse recovery current, and power dissipation attributed therewith, are substantially reduced by placing a snubbing network 74 at the high side of converter 60. Snubbing network 74 comprises second switch 64b, second inductor 76 and a diode 78 placed in series across switch 64a. Network 74 further includes a capacitor 80 and a diode 82, each of which have a terminal. The terminal of capacitor 80 is coupled between first switch 64a and first inductor 66, whereas the terminal of diode 82 is coupled between second switch 64b and second inductor 76.

Attributed with the output impedance of the regulated voltage supply, the input voltage terminal $V_{IN}$ is maintained relatively constant by input capacitor 86. Capacitor 86 is modeled from the input power supply and maintained at relatively constant input voltage $V_{IN}$, regardless of the condition of switches 64a and 64b.

Switches 64a and 64b serve to minimize transient current spikes demonstrated as power dissipation or EM emission. Switches 64a and 64b work in conjunction with one another, in addition to the various other snubbing network 74 components to reduce the primary cause of power dissipation during first switch 64a closure. A more detailed description is provided in reference to FIGS. 6a–6h in order to better understand the beneficial features of snubbing network 74. FIGS. 6a–6h illustrate various voltage, current and power quantities attributed to converter 60, depending on the state of switches 64a and 64b. At time $T_1$, second switch 64b initiates closure; at time $T_2$, second switch opens; and, at time $T_3$, first switch 64a closes. Thus, the closure of switches 64 are staggered and, more importantly, second switch 64b is closed and then opened before switch 64a is closed. Switch 64a is preferably closed almost immediately after switch 64b is opened. In the alternative, switch 64a is closed while switch 64b remains closed. The overlap of switches 64a and 64b closures is relatively short. It is not until time $T_4$ that first switch 64a opens again, eventually leading to a steady state condition at time $T_5$.

Figure 6A:
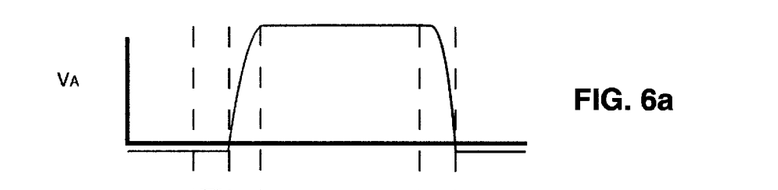
FIGS. 6a–6h are timing diagrams of operational voltage, current and power characteristics of the circuit shown in FIG. 5.

Turning now to FIG. 6a, the effect of switch actuation on the node $V_A$ is shown. $V_A$ voltage increase occurs by supplying power from the input terminal, which happens when second switch 64b is closed at time $T_1$. A delay in voltage rise occurs primarily due to the current limiting features of inductor 76 and, more specifically, the slow charge accumulation on capacitor 80. Eventually, however, voltage $V_A$ will be relatively large compared to the negative voltage normally associated when those switches are open. The amount of negative voltage is dictated by the threshold voltage drop across diode 72. Once $V_A$ is charged positive, then diode 72 becomes reversed biased over the time duration between $T_2$ and $T_3$. Reverse bias over that duration implies reverse recovery current existing before reverse bias occurs.

Figure 6B:
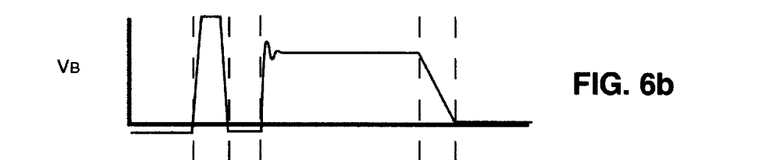
Figure 6C:
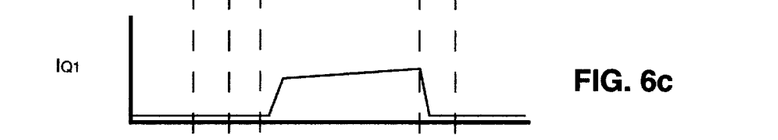
Figure 6D:
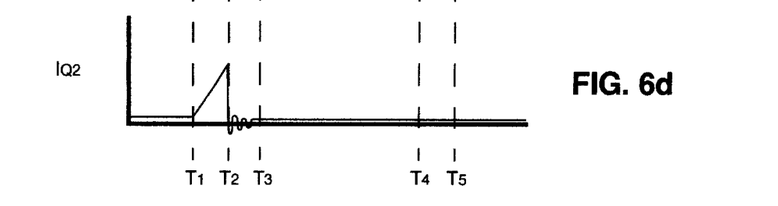

FIG. 6b indicates the voltage at node $V_B$. Increase in voltage at $T_1$, and decrease at time $T_2$ is relatively instantaneous, with some ringing attributed to transitions at $T_3$. FIG. 6c illustrates the current through first switch 64a. It is noted that current does not exist except for sub-threshold currents, until after switch 64a is closed at time $T_3$. The current remains, and slightly increases until switch 64a is opened at time $T_4$. FIG. 6d indicates the current through second switch 64b. Current is shown to increase at closure of second switch 64b, and remains until switch 64b is opened at time $T_2$. Thereafter, a slight ringing occurs but nonetheless remains relatively low.

Figure 6E:
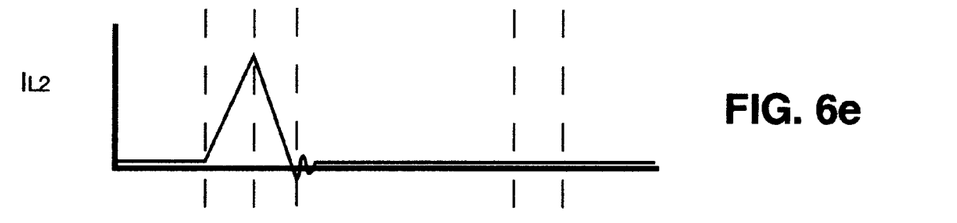

FIG. 6e illustrates the current through second inductor 76. Current is shown to increase when second switch 64b is closed, but decreases when switch 64b is opened. There may be slight ringing of current at the moment in which first switch 64 closes due to the unit step function and the inductance/capacitance of that node.

Figure 6F:
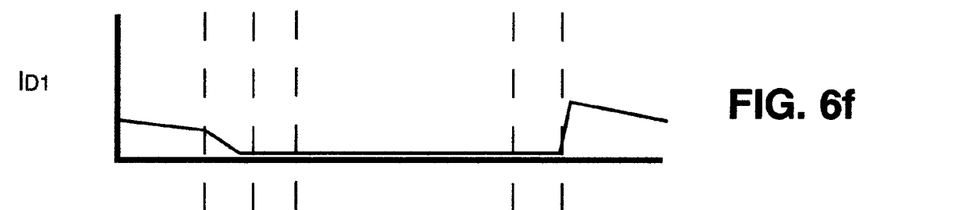
Figure 6G:
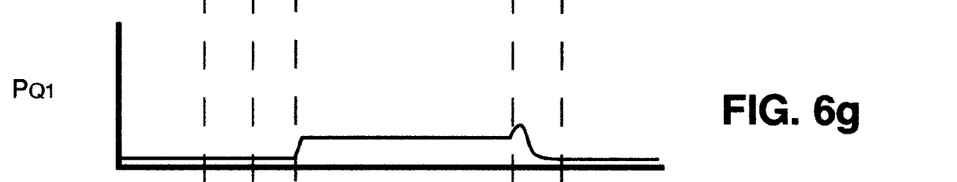
Figure 6H:
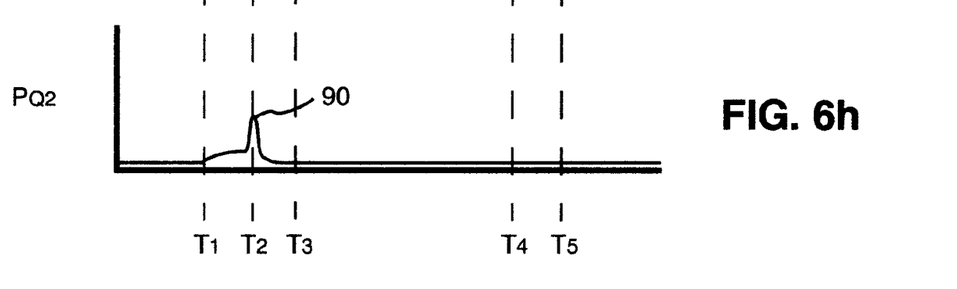

FIG. 6f indicates the current through freewheeling diode 72. A comparison between FIG. 6f and FIG. 4c indicates the importance of snubbing network 74. Specifically, FIG. 6f illustrates minimal reverse recovery current through diode 72. This is due mostly to the reverse bias upon diode 72 before closing first switch 64a. Minimal reverse recovery current demonstrates an advantage when referencing FIGS. 6g and 6h. FIG. 6g indicates minimal power dissipation across first switch 64a at the time at which it is closed ($T_3$). This is in stark contrast to that shown in FIG. 4e. Furthermore, the power dissipation through second switch 64b is minimal. The relatively small peak 90, shown in FIG. 6h, is attributed to the normal turn-off loss, or AC component, of any switch activation. It, however, is not associated with reverse recovery current attributed to conventional designs. Power dissipation during opening of first switch 64a at time $T_4$ is smaller in the improved design due to the relative lack if voltage/current overlap caused by capacitance 80. A further benefit of capacitor 80 is improved switching speed for element 64a due to reduced Miller current.

During operation, various functional characteristics are undertaken. At time $T_1$, second switch 64b closes, causing current to flow into second inductor 76. Second diode, however, was not previously in conduction, and therefore no reverse recovery current is associated with that diode. The current in second inductor begins to rise rapidly since inductor 76 is much smaller than inductor 66. The amount of current rise eventually matches the current in first inductor 66. At that point, freewheeling diode 72 is no longer in conduction and the voltage begins to rise across capacitor 80, turning freewheeling diode 72 off (reversed bias) in a soft fashion. Second switch 64b is then turned off judiciously at the point that it has enough energy to charge capacitor 80 to the positive rail as well as supply the load current through first conductor 66. At time $T_3$ first switch 64a closes with substantially zero volts across its terminals, resulting in a lossless switch-on transition for switch 64a. Second switch 64b has been previously turned off in a hard fashion but does not have to withstand a steady state conduction loss. Accordingly, switch 64b can be much smaller in its current caring capacity than switch 64a. At time $T_4$, first switch 64a opens with low power dissipation due to the effect of capacitor 80 in holding voltage $V_A$ constant. Between times $T_4$ and $T_5$, capacitor 80 supplies the load current and provides for a slower turn on (forward bias) of freewheeling diode 72 which aids in reducing EM due to the lessening effect of forward recovery current.

The current in second inductor 76 at times $T_2$ to $T_3$ decays back through the load. From times $T_3$ to $T_4$, the voltage $V_B$ oscillates radically but has no appreciable power content due to the small charge capacity at that node. Its contributation to EM is far offset by the gains from soft switching of freewheeling diode 72. Overall power dissipation is substantially reduced and dispersed from first switch 64a throughout various components (e.g., second switch 64b) of snubbing network 74. Those components are laterally displaced over a larger silicon substrate area and therefore attribute lower heat accumulation across a localized area of that substrate. There is only one relatively hard switch transition made by a smaller, faster active switch. All switch closure transitions are made with the associated rectifiers in their off (open) state.

By employing a pair of switches, and a uniquely arranged snubbing network, heat generation within converter 60 is reduced, and EM radiation during transient times are also reduced. Heat reduction is achieved by lowering the power dissipation within converter 60, and EM is reduced by lowering the harmonic content of the switching elements. Reducing both power dissipation and EM occurs partially at the expense of adding more components; however, applications which are particularly sensitive to power dissipation and EM noise spikes may require the added complexity of those components.

Figure 7:
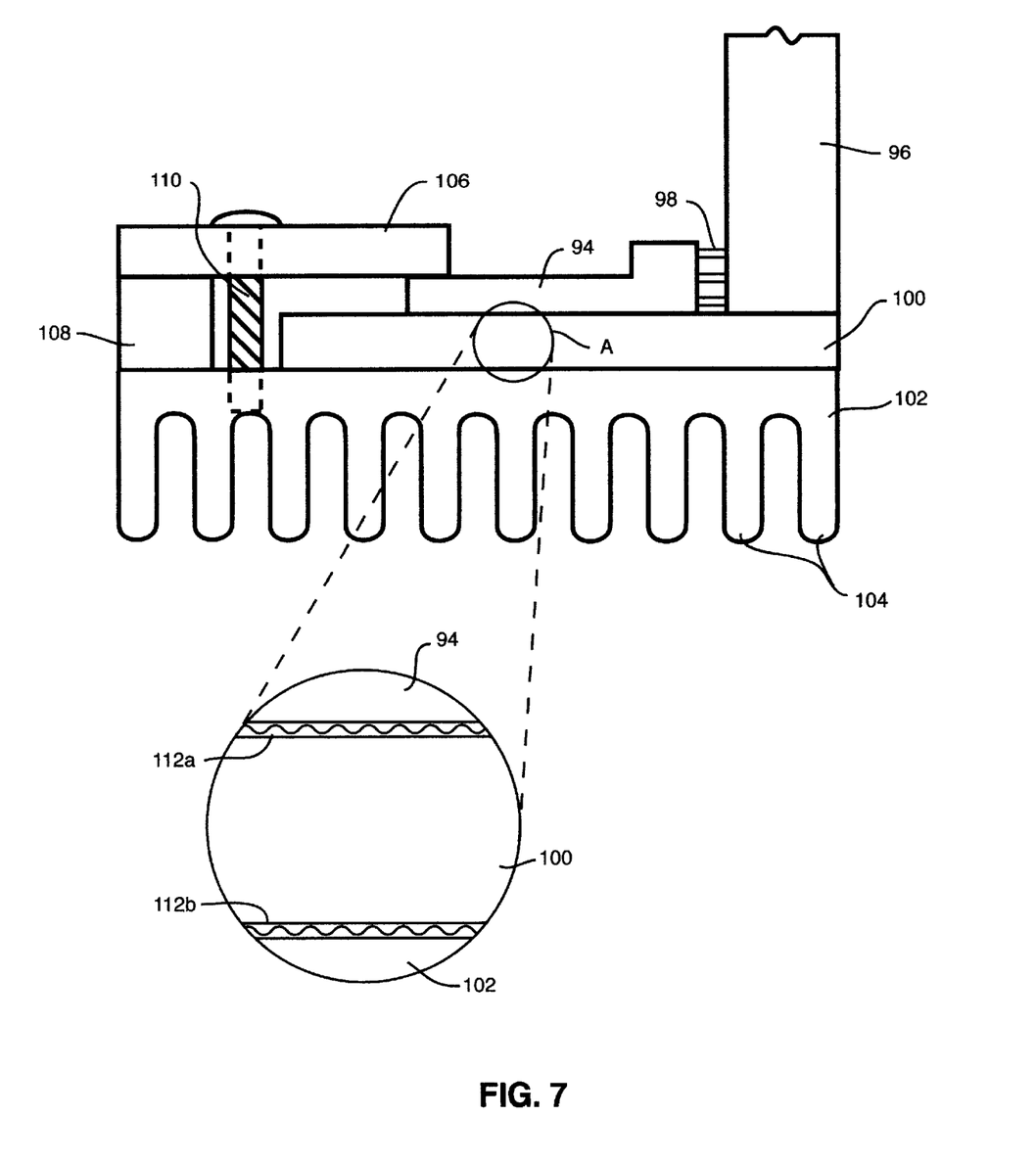
FIG. 7 is a side perspective view of a power switching device (e.g., power transistor) mounted to a printed circuit board and to a thermal transfer element according to an embodiment of the present invention.

To properly handle the reduced heat generated in converter 60, thermal transfer or heat dissipation from the switches is needed. An improved connection assembly is therefore presented for dissipating heat from power switching devices, such as first and second switches 64a and 64b. FIG. 7 illustrates such an assembly 92, according to one embodiment. Assembly 92 comprises a packaged (i.e., encapsulated) power switching device 94 which is electrically and mechanically coupled to a printed circuit board ("PCB") 96. Connection between device 94 and PCB is made via leads 98 extending from device 94 is accordance with various physical mounting techniques.

Device 94 includes two opposed surfaces, a first surface and a second surface. A first surface is substantially planar and is arranged proximate to a thermal conductive member 100. Member 100 is made of any material which can conduct thermal energy but does not substantially conduct electrical current. Member 100 includes two opposing, substantially planar first and second surfaces. The first surface of member 100 is arranged proximate to device 94, and the second surface of member 100 is arranged proximate to a thermal transfer element 102.

Thermal transfer element 102, like member 100 conducts thermal energy and includes two opposing surfaces. A first surface of element 102 is substantially planar in the region proximate to member 100. The opposing second surface of element 102 comprises a plurality of surfaces 104 which protrude from the second surface a spaced distance apart. Surfaces 104 act somewhat as radiator fins in that their protrusion serves to enhance the amount of surface area exposed to a cooling ambient. Surfaces 104 are arranged in a particular manner relative to a cooling ambient drawn across those surfaces, as will be described in detail below.

To fix member 100 between device 94 and element 102, a retainer 106 is provided. Retainer 106 has opposing surfaces. One surface of retainer 106 is drawn against device 94, and may also be drawn against a portion 108 of the first surface of transfer element 102.

A threaded member 110 can be used to draw retainer 106 securely against device 94 and surface 108. According to one example, member 110 includes outward extending threads which reciprocate with threads on the inner diameter of an aperture within transfer element 102. There may also be included inward facing threads within an aperture of retainer 106. By rotating member 110 relative to transfer element 102 and retainer 106, the distance between transfer element 102 and retainer 106 is reduced. This translates to a biasing force sufficient to enhance thermal transfer between device 94 and transfer element 102.

An exploded view along area A indicates in detail the interface between device 94, conductive member 100 and transfer element 102. Conductive member 100 provides a thermal conduit of heat transferred from device 94 to transfer element 102 and eventually to the ambient surrounding surfaces 104. In order to provide an efficient conduit, transfer across surfaces must be enhanced. According to a preferred embodiment, a paraffin-based, thermally conductive material 112a and 112b are placed at the interface between surfaces within the thermal transfer conduit. Material 112 serves essentially to fill any gaps or irregular, disparate surface planarity which might exist at the interface between substantially rigid members. Filling of those gaps is essential to rendering the thermally resistive gaps conductive. It is postulated that material 112 flows outward and reduces the gap between the adjacent rigid members when exposed to heat. When heat is reduced, material 112 flows back into the interface area. Ingress and egress may therefore serve a heat regulation function.

It is preferred that conductive member 100 be made of, for example, $Al_2O_3$, and that transfer element 102 be made of any metal-based material, a suitable material being aluminum or $Al_2O_3$.

Figure 8:
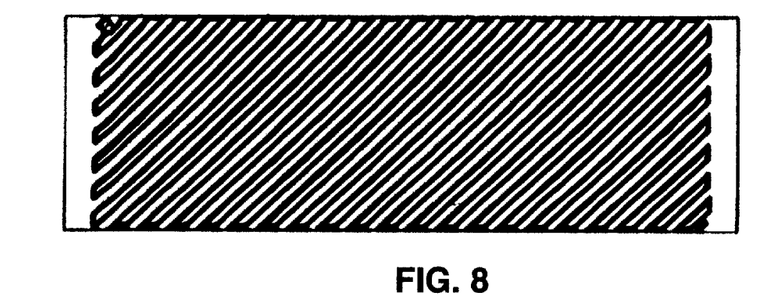
FIG. 8 is a top plan view of a thermal transfer element.
Figure 9:
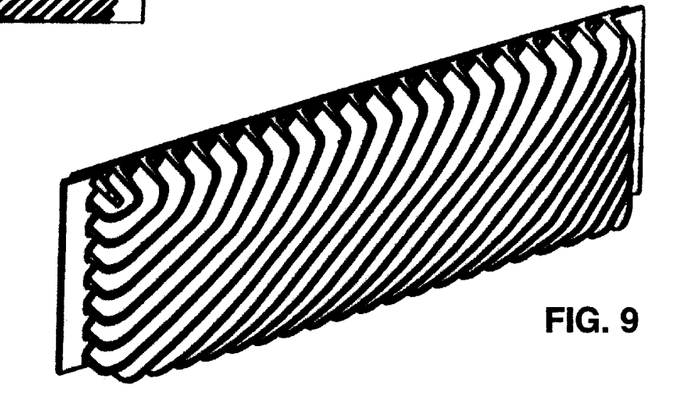
FIG. 9 is a perspective, top view of the thermal transfer element, the side opposite being a substantially flat surface.
Figure 10:
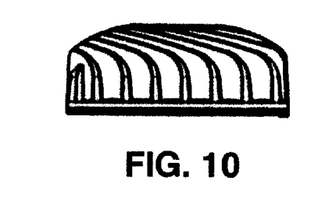
FIG. 10 is an end view of the thermal transfer element.
Figure 11:
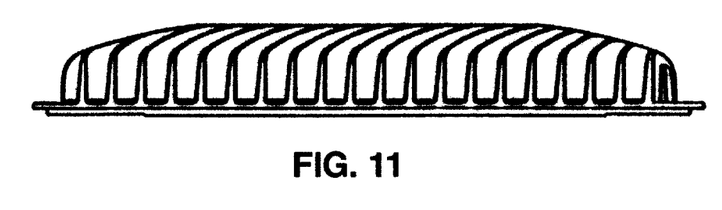
FIG. 11 is a front view of the thermal transfer element.
Figure 12:
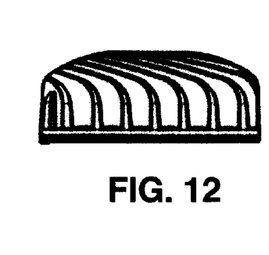
FIG. 12 is an end view of the thermal transfer element opposite the end shown in FIG. 10.

Referring to FIGS. 8–12, various view angles of thermal transfer element 102 are shown. FIG. 8 is a top plan view, while FIG. 9 is a perspective view of the plurality of surfaces extending from the top of transfer element 102. The surfaces are shown extending in a diagonal fashion such that if, for example, air is forced or convected vertically or horizontally (i.e., at a 45 degree angle) relative to the surfaces, enhanced thermal transfer is achieved. It is believed that by arranging the surfaces in a diagonal pattern, ambient air will be redirected in a more efficient pattern between the spaced surfaces for all likely physical orientations of the ballast. Redirection of moving air implies enhanced thermal communication and therefore increased heat dissipation. FIG. 10 indicates an end view of the thermal transfer unit, in mirror image of the opposing end view shown in FIG. 12. FIG. 11 is a front view of transfer element 102, the back view being a mirror image of the front view.

It will be appreciated to those skilled in the art having the benefit of this disclosure that this invention is believed applicable to any lamp discharge ballast requiring minimal power dissipation and EM emission. Furthermore, it is also to be understood that the form of the invention shown and described is to be taken as exemplary, presently preferred embodiments. Various modifications and changes may be made to each and every component provided, however, the snubbing effect set forth in the specification and defined in the below-identified claims is maintained. It is therefore intended that the following claims be interpreted to embrace all such modifications and changes and, accordingly, the specification and drawings are to be regarded in an illustrative rather than a restrictive sense.

What is claimed is:

1. A voltage converter, comprising:
   a first switch and a first inductor coupled in series between an input terminal and an output terminal of the converter; and
   a second switch, a second inductor and a diode coupled in series across the first switch, wherein said second switch is adapted to close prior to closing said first switch for reducing transient power dissipation in the interim between closing of the second switch and closing of the first switch.

2. The converter as recited in claim 1, wherein said first switch comprises a first power transistor and said second switch comprises a second power transistor of lesser current carrying capacity than the first power transistor.

3. The converter as recited in claim 1, further comprising a freewheeling diode having a terminal thereof coupled between the first switch and the first inductor for receiving current from the first inductor during times when the first and second switches are substantially open.

4. The converter as recited in claim 3, wherein said freewheeling diode is coupled to receive reverse bias voltage to substantially eliminate reverse recovery within the freewheeling diode prior to closing the first switch.

5. The converter as recited in claim 4, wherein said freewheeling diode is coupled to receive reverse bias via closing of the second switch.

6. The converter as recited in claim 1, wherein said diode is coupled to receive current substantially equal to that sent through the first inductor during times when the first switch is substantially open and the second switch is substantially closed.

7. The converter as recited in claim 1, further comprising a capacitor having a terminal thereof coupled between the first switch and the first inductor for receiving voltage forwarded upon the input terminal during closing of the first switch or closing of the second switch.

8. The converter as recited in claim 1, wherein said voltage converter is a DC-to-DC converter.

9. The converter as recited in claim 1, wherein said second switch is adapted to close and subsequently open prior to closing the first switch.

10. A system for modulating power to a gas-filled lamp, comprising:
  a ballast adapted, during use, to produce a modulated voltage output from a pair of switches responsive to a switching control signal forwarded to the switches, wherein the switching control signal causes a first switch of the pair of switches to close after a second switch of the pair of switches closes, the second switch being in series with an inductor and a diode, all in parallel with the first switch; and
  said gas-filled lamp having a spaced pair of electrodes for receiving the modulated voltage.

11. A method for snubbing noise emitted from a discharge lamp ballast comprising:
  providing a first switch connected in series with a first inductor between a power supply and a discharge lamp;
  providing a second switch connected in series with a second inductor and a diode, all of which are connected in parallel with said first switch;
  providing a freewheeling diode having a terminal connected between the first switch and the first inductor;
  closing the second switch to reverse bias the freewheeling diode and minimize voltage differential across the first switch; and
  opening the second switch while closing the first switch to minimize noise emitted during closure of the first switch.

12. The method as recited in claim 11, wherein said closing the second switch comprises forming a depletion region at the pn junction of the freewheeling diode, and maintaining the depletion region up to the time in which the first switch is closed.

13. The method as recited in claim 11, wherein said closing the second switch comprises forwarding current through said diode which is substantially equal to current previously forwarded through said freewheeling diode.

14. The method as recited in claim 11, wherein said first and second switches comprise transistors, and wherein the first transistor and the second transistor each comprise a respective gate width such that the gate width of the first transistor is larger than the gate width of the second transtor.

15. The method as recited in claim 11, wherein closing the second switch comprises charging a capacitor coupled to one terminal of a current path of the first switch to a voltage substantially equal to a pre-existing voltage on the other terminal of the current path of the first switch.

16. The method as recited in claim 11, further comprising opening and then closing the first switch subsequent to opening the second switch.

17. The method as recited in claim 11, wherein the discharge lamp ballast exist at least partially within a luminaire comprising a control unit coupled to dispatch a switching control signal to the first and second switch.

18. A system for modulating power to a gas-filled lamp, comprising:
  a ballast adapted, during use, to produce a modulated voltage output from a pair of switches responsive to a switching control signal forwarded to the switches, wherein the second switch is coupled in series with a second inductor and a diode, and wherein the second switch, the second inductor and the diode are connected in parallel with the first switch, and wherein the switching control signal causes a first switch of the pair of switches to close after a second switch of the pair of switches closes, wherein both switches result in a voltage output of the same polarity; and
  said gas-filled lamp having a spaced pair of electrodes for receiving the modulated voltage.

19. A system for modulating power to a gas-filled lamp, comprising:
  a ballast adapted, during use, to produce a modulated voltage output from a pair of switches responsive to a switching control signal forwarded to the switches, wherein the second switch is coupled in series with a second inductor and a diode, and wherein the second switch, the second inductor and the diode are connected in parallel with the first switch, and wherein the switching control signal causes a first switch of the pair of switches to close after a second switch of the pair of switches closes, wherein the direction which current flows is not dependent on which switch is closed; and
  said gas-filled lamp having a spaced pair of electrodes for receiving the modulated voltage.

\* \* \* \* \*